Oct. 23, 1956  F. R. SCHMID  2,767,605
HAND TOOL FOR TRUING PIPE ENDS
Filed May 5, 1953

INVENTOR.
FRANK R. SCHMID
BY Woodling and Krost
attys

United States Patent Office 2,767,605
Patented Oct. 23, 1956

2,767,605

HAND TOOL FOR TRUING PIPE ENDS

Frank R. Schmid, Cleveland, Ohio, assignor of one-half to Henry Edward Wiersch

Application May 5, 1953, Serial No. 353,121

2 Claims. (Cl. 81—15)

The invention relates in general to pipe truing devices and more particularly to a simple one-piece tool, which is adapted to be slipped over the end of a pipe or tube to form it into a true cylindrical shape of correct size.

The prior art has shown different forms of tools for making cylindrical a flattened end of a pipe or tube, but they have usually been of several parts and require considerable manipulation and are too bulky or hard to operate. The present invention discloses a tool which is simple, efficient and inexpensive and one which is quick and convenient to use to restore or reshape a deformed end of a pipe or tube.

An object of the invention is to provide a pipe edging device which is durable and will withstand rough usage.

Another object of the invention is to provide a pipe truing device which may be used with a minimum of effort.

Still another object of the invention is to provide a pipe truing tool which will withstand rough usage and wherein the conical and cylindrical forming surfaces of the tool are on the inside where they cannot be scratched or damaged by rough handling or banging within the tool box of the workman.

Still another object of the invention is to provide a tube shaping tool which is formed of a single body of case hardened steel so that it has a hard surface, yet tough and an unbreakable core, so that it can be hit with a hammer, if need be, yet can be easily operated by hand.

Another object of the invention is to provide a pipe truing device which can be used with pipes or tubes of copper, brass or aluminum or alloys thereof, and may also be used with wrought metal pipe or electrical conduit.

Still another object of the invention is to provide a tube shaping tool which does not stretch the metal of the pipe or tube, rather it will evenly shape the tube to a uniform cylinder and a uniform diameter so that the customary solder fittings may be used with the proper clearance with the soldered fitting of the tube.

Other objects and a fuller understanding of this invention may be had by referring to the following description and claims, taken in conjunction with the accompanying drawings, in which:

Figure 1:
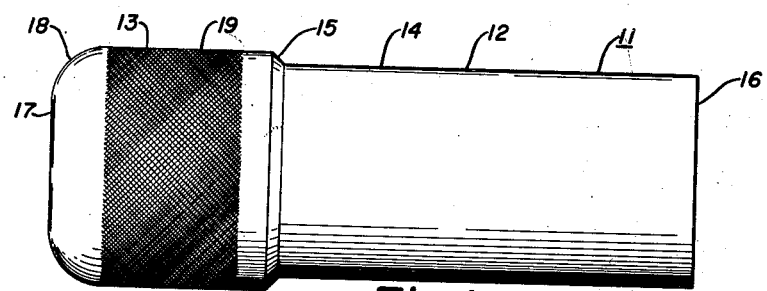
Figure 1 is a side view of the preferred embodiment of the invention.
Figure 3:
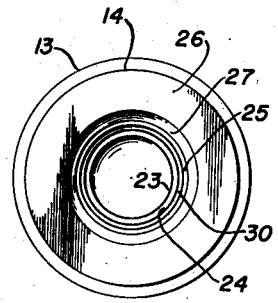
Figure 3 is an end view.
Figure 2:
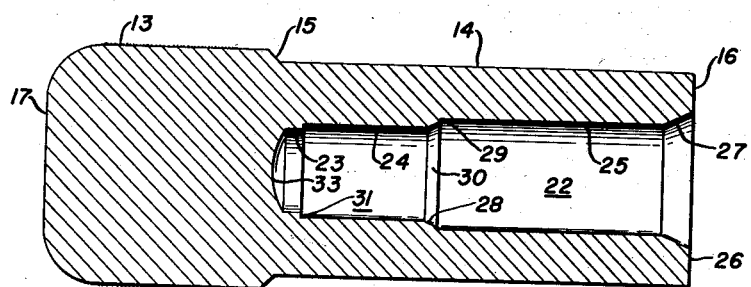
Figure 2 is a longitudinal sectional view.

The Figures 1 to 3 show the preferred form of the invention which is a one-piece pipe truing device 11. The device 11 has a body 12 with first and second outer cylindrical surfaces 13 and 14. A sloping shoulder 15 joins the surfaces 13 and 14. The body 12 has an open end 16 and a closed end 17. The closed end 17 has rounded corners 18, which merge with the cylindrical surfaces 13. The cylindrical surface 13 is provided with a knurled portion 19 to provide a nonslip hand grip. The cylindrical surface 13 is approximately one-half the length of the cylindrical surface 14.

The body 12 is provided with a stepped bore 22, which is formed from third, fourth and fifth cylindrical surfaces 23, 24 and 25. The cylindrical surfaces 13, 14, 23, 24 and 25 are generally coaxial, with the surfaces 23, 24, and 25 generally coextensive with the surface 14. The open end 16 is formed by an annular planar face 26. A conical flare 27 at an angle of about twenty degrees joins the cylindrical surface 25 and the planar face 26.

The fourth and fifth cylindrical surfaces 24 and 25 are joined at a first step portion 28. This step portion 28 includes a small annular shoulder 29 and a second conical flare 30. The conical flare 30 is similar to the conical flare 27. The third and fourth cylindrical surfaces 23 and 24 are joined by a second step portion 31 and in this case it consists of an annular shoulder. A concave end wall 33 closes the inner end of the third cylindrical surface 23.

Figure 5:
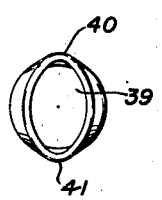
Figure 5 is a front end view of the tube of Figure 4.
Figure 4:
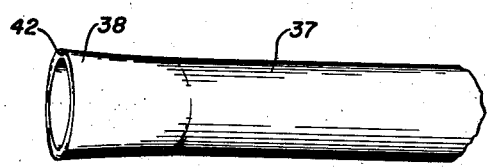
Figure 4 is a three-dimensional view of a tube having a flattened end.
Figure 6:
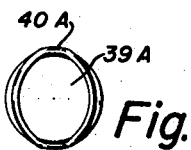
Figure 6 is a front end view of the tube after being partially shaped in my tube-shaping device.

The Figures 4, 5 and 6 show a tube or pipe, which is malleable and hence may be restored from its deformed condition to a condition of true cylindricity. A workman many times has pipe or tube, the ends of which have been accidentally flattened or deformed, so that they no longer are truly cylindrical and hence will not easily slide into the coupling or fitting with which used. Many copper, brass or aluminum tubes are used with solder fittings, which must have a predetermined clearance all the way around the tube in order to obtain a good soldering joint by capillary action. After the tube has been accidentally flattened, many workmen will cut off the end of the tube in order to obtain a true cylindrical portion of the tube to be connected to the fitting. This is wasteful of rather expensive material and many times a piece of tubing, if cut back, would be too short for connection between the desired joints especially if the tubing is one which has already been cut in length for the job. The Figures 4 and 5 show a tube 37 having a flattened end portion 38. The Figure 5 shows the partially closed opening 39 at the end of the tube. The tool 11 may be slipped over the end of the tube 37. The outer diameter of the tube 37 is just slightly smaller than the diameter of the fourth cylindrical surface 24. The flattened tube 37 may first strike the conical flare 27 at end portions 40 and 41, and be compressed so that the outer diameter of the flattened end 38 is the same as the diameter of the cylindrical surface 25. The tube 37, at this point in the shaping operation, will have a form similar to that shown in Figure 6, wherein the end portions have been flattened as shown in 40–A and 41–A. The opening 39–A is thus enlarged by this preliminary forming operation.

Most tubing is cut by one or more cutting rollers, which are rolled around and forced into the outer surface of the tube until the tube is severed. This provides a rounded edge 42 on the end of the tube 37. This rounded edge 42 will still remain at the end portions 40–A and 41–A and hence will readily slide over the small annular shoulder 29. Thus, the second conical flare 30 will properly shape the flattened end 38 into a true cylinder as determined by the diameter of the cylindrical surface 24. When the tool is pressed home, the end of the tube 37 will abut the shoulder 32. The slight recess caused by the third cylindrical surface 23 will provide a receptacle for any chips, metal slivers or other foreign substances, and hence such foreign substances will not be held between the outer surface of the tube 37 and the cylindrical surface 24 to scratch or otherwise mar the outer surface of the tube 37.

The fact that the shaping or truing operation is performed in two steps for severely flattened tubing is a definite advantage of the present invention. The metal used in most malleable tubing is readily work-hardened and with only one deformation, and partial reshaping of the metal, the tube is considerably harder than when initially drawn. This rather rapid work-hardening means that if one were to attempt to reshape the tube to a true cylinder by a single rather steep conical flare, the tube might buckle between the tool and the point where the workman grasps the tube. By performing the reshaping operation in two separate locations, the length of the cylindrical surface 25 will prevent any buckling of the tube. For tubing which is not badly flattened or deformed, the amount of work-hardening is not as pronounced, and hence having the slightly flattened end contact only the conical flare 30 will be sufficient to reshape such tube into a true cylinder. A set of tools would be used by a workman so that he had a device to accommodate each of the various sizes of pipe or tubing with which he has to work.

The cylindrical surface 25 and conical flare 27 may further be used to reshape a larger size diameter tubing, and this would operate the same way as the cylindrical surface 24 and conical flare 30 upon the smaller diameter tubing.

Figure 7:
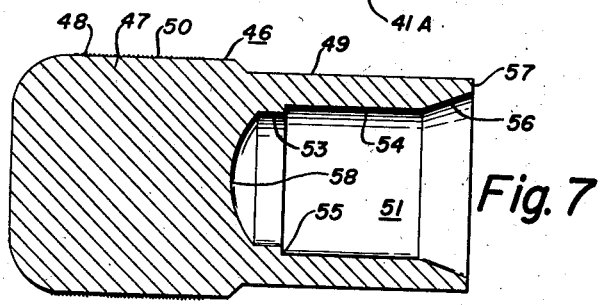
Figure 7 is a longitudinal sectional view of a modified form of the invention.

The Figure 7 shows a modified form of the invention wherein a pipe-shaping tool 46 has a body 47 with a stepped outer surface formed by cylindrical surfaces 48 and 49. The cylindrical surface 48 again has a knurled portion 50. The body 47 again has a stepped bore 51 formed by third and fourth cylindrical surfaces 53 and 54. An annular shoulder 55 joins the surfaces 53 and 54 and a conical flare 56 joins the cylindrical surface 54 and the planar face 57. The bore 51 has a closed end 58. The tool 46 may be used in a manner similar to the use of either cylindrical surfaces 24 or 25 of the pipe truing device 11 in reshaping the deformed end of a tube which has the proper outer diameter to be received within the cylindrical surface 54.

The tools 11 and 46 of Figures 1, 2, 3 and 7 are preferably formed from case-hardened steel so that the inner core of the bodies 12 and 47 are tough and durable, whereas, the outer surface skin is harder to resist hard abrasion and scratches. Since the inner core of the bodies is tough, the tool may be roughly handled and even struck with a hammer, although the tool is so easy and simple to use that hand operation is all that is necessary except for extremely hard pipe or tubing. Further, the case-hardening means that the workman may carelessly treat the tool and throw it in among other tools in his work box without taking any particular care of the tool. Further, all working cylindrical and conical surfaces for shaping the pipe or tube are on the inside of the tool and hence cannot be damaged by rough handling.

The tool is simple and economical to produce since it may be forged with a roughly shaped longitudinal hole during the forging process. Next, the tool may be bored or drilled to form the cylindrical surfaces 24 and 25 and the various shoulders and flares. The cylindrical surface 23 and concave end wall 33 might thus be left as roughly formed by the forging operation. Alternatively, the tool may be simple and economically formed by cast steel, in which case the tool may have a hole roughly formed therein by a male mold. As a still further alternative, the tool may be quickly and easily formed from solid bar stock by drilling or boring. The bodies 12 or 47 may then be case-hardened after forming to produce the hard surface and tough core desired.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pipe or tube shaping tool comprising a one-piece body of case hardened steel, a stepped outer surface on said body having first and second generally cylindrical and coaxial surfaces, a knurled hand grip surface on said first cylindrical surface, said first cylindrical surface being slightly larger in diameter than said second cylindrical surface, an open end and a closed end on said body, said closed end being generally rounded and said first cylindrical surface being disposed contiguous to and merging with said rounded closed end, an annular planar surface at said open end, third and fourth generally cylindrical and coaxial surfaces defining a stepped bore longitudinally disposed in said body and generally coaxial with said first and second cylindrical surfaces, and generally coextensive with said second cylindrical surface, said fourth cylindrical surface being larger than said third cylindrical surface and disposed adjacent said open end, a frusto-conical flare contiguous with said planar face and said fourth cylindrical surface, said frustum of a cone having a maximum diameter at said planar face approximately seven per cent larger than the diameter of said fourth cylindrical surface, an annular planar shoulder contiguously joining said third and fourth cylindrical surfaces at the step portion of said bore, said annular shoulder having a radial dimension approximately equal to the wall thickness of the pipe to be shaped cylindrically, and an inner end defining the bottom of said bore and closing the inner end of said third cylindrical surface.

2. A pipe shaping tool comprising a one-piece surface hardened body, a knurled hand grip outer surface on said body, an open end and a closed end on said body, said closed end being generally rounded, first, second and third generally cylindrical and coaxial surfaces defining a stepped bore longitudinally disposed in said body and generally coaxial with said outer surface, said third cylindrical surface being approximately fifty per cent longer than said second cylindrical surface and disposed adjacent said open end, a first frusto-conical flare contiguous with said open end and said third cylindrical surface, said frustum of a cone having a maximum diameter at said open end approximately seven per cent larger than the diameter of said third cylindrical surface, a first annular planar shoulder and a second frusto-conical flare contiguously joining said third and second cylindrical surfaces in that order at one step portion of said bore, said annular shoulder having a radial dimension less than the difference between the maximum and minimum diameters of said second frusto-conical flare and approximately equal to the wall thickness of the pipe to be shaped cylindrically, a second annular planar shoulder contiguously joining said first and second cylindrical surfaces at a second step portion of said bore, said second shoulder having a radial dimension approximately the same as said first shoulder and approximately equal to the wall thickness of the pipe to be shaped cylindrically, and an inner end defining the bottom of said bore and closing the inner end of said first cylindrical surface.

References Cited in the file of this patent

UNITED STATES PATENTS

| | | |
|---|---|---|
| 450,910 | Fisher | Apr. 21, 1891 |
| 1,971,251 | Cornell | Aug. 21, 1934 |
| 2,162,165 | Gabel | June 13, 1939 |

FOREIGN PATENTS

| | | |
|---|---|---|
| 345,853 | Germany | Dec. 16, 1921 |